US012148564B2

(12) United States Patent
Yu et al.

(10) Patent No.: US 12,148,564 B2
(45) Date of Patent: Nov. 19, 2024

(54) MANUFACTURING METHOD OF AN INTEGRALLY FORMED INDUCTOR

(71) Applicant: Shenzhen Sunlord Electronics Co., Ltd., Guangdong (CN)

(72) Inventors: Xinshu Yu, Guangdong (CN); Youyun Li, Guangdong (CN); Shengcheng Xia, Guangdong (CN); Zehong Yao, Guangdong (CN); Yupeng Hong, Guangdong (CN); Yingying Wang, Guangdong (CN); Qiang Su, Guangdong (CN); Wanhe Yi, Guangdong (CN); Xin Che, Guangdong (CN)

(73) Assignee: Shenzhen Sunlord Electronics Co., Ltd., Guangdong (CN)

(*) Notice: Subject to any disclaimer, the term of this patent is extended or adjusted under 35 U.S.C. 154(b) by 714 days.

(21) Appl. No.: 17/322,920

(22) Filed: May 18, 2021

(65) Prior Publication Data

US 2022/0157519 A1 May 19, 2022

Related U.S. Application Data

(63) Continuation of application No. PCT/CN2020/129432, filed on Nov. 17, 2020.

(51) Int. Cl.
*H01F 7/06* (2006.01)
*H01F 1/24* (2006.01)
(Continued)

(52) U.S. Cl.
CPC .......... *H01F 41/0246* (2013.01); *H01F 1/24* (2013.01); *H01F 17/045* (2013.01);
(Continued)

(58) Field of Classification Search
CPC .. H01F 17/045; H01F 41/0246; H01F 41/005; H01F 41/10; H01F 27/027;
(Continued)

(56) References Cited

U.S. PATENT DOCUMENTS

2012/0132847 A1* 5/2012 An .................... C01G 53/006 252/62.59
2016/0012962 A1* 1/2016 Lee .................... H01F 27/292 427/116

(Continued)

FOREIGN PATENT DOCUMENTS

CN 2831355 Y 10/2006
CN 101354947 A * 1/2009

(Continued)

*Primary Examiner* — Paul D Kim
(74) *Attorney, Agent, or Firm* — Winston Hsu

(57) ABSTRACT

A manufacturing method of an integrally formed inductor, comprises: sintering a soft magnetic material to prepare a magnetic core plate with a plurality of grooves; respectively putting hollow coils into the plurality of grooves; putting a magnetic core plate provided with coils into a forming die, adding a soft magnetic material in a fluid state, and integrally forming the soft magnetic material in the fluid state on the magnetic core plate through pressing; coating semi-finished inductors with an insulating material to form an insulating coating layer, and exposing only two terminals of the coils; areas where the coil terminals are exposed on a surface of the insulating coating layer being metallized to form electrodes of the integrally formed inductor. Therefore, the disclosure provides a manufacturing method of an integrally formed inductor which is subminiature in size, ultra-thin and high in reliability.

8 Claims, 5 Drawing Sheets

(51) Int. Cl.
*H01F 17/04* (2006.01)
*H01F 27/255* (2006.01)
*H01F 27/29* (2006.01)
*H01F 41/02* (2006.01)

(52) U.S. Cl.
CPC ......... *H01F 27/255* (2013.01); *H01F 27/292* (2013.01); *H01F 2017/048* (2013.01)

(58) Field of Classification Search
CPC .. H01F 27/255; H01F 27/2852; H01F 27/292; H01F 1/24; H01F 2017/048
See application file for complete search history.

(56) References Cited

U.S. PATENT DOCUMENTS

| | | | | |
|---|---|---|---|---|
| 2017/0062115 | A1 | 3/2017 | Kang | |
| 2018/0204657 | A1* | 7/2018 | Shinkai | B22F 1/105 |

FOREIGN PATENT DOCUMENTS

| | | | |
|---|---|---|---|
| CN | 101412292 | A | 4/2009 |
| CN | 103050224 | A | 4/2013 |
| CN | 103208343 | A | 7/2013 |
| CN | 104240898 | A | 12/2014 |
| CN | 104269252 | A | 1/2015 |
| CN | 104616878 | A | 5/2015 |
| CN | 105355408 | A | 2/2016 |
| CN | 105355409 | A | 2/2016 |
| CN | 206893416 | U | 1/2018 |
| CN | 109036779 | A | 12/2018 |
| CN | 109545505 | A | 3/2019 |
| JP | 2017-11042 | A | 1/2017 |
| KR | 10-2015-0105087 | A | 9/2015 |

* cited by examiner

MANUFACTURING METHOD OF AN INTEGRALLY FORMED INDUCTOR

CROSS REFERENCE TO RELATED APPLICATIONS

This application is a continuation application of PCT/CN2020/129432, filed on 2020 Nov. 17. The contents of PCT/CN2020/129432 are all hereby incorporated by reference.

BACKGROUND OF THE INVENTION

1. Field of the Invention

The disclosure relates to an electronic element, in particular to an integrally formed inductor and a manufacturing method thereof.

2. Description of the Prior Art

With the advent of 5G era, electronic information and AI intelligence have become an indispensable part of people's life, and people's experience requirements for electronic products are constantly improving. The intelligent wearable product is smaller and smaller, and the accompanying electronic components also need to be developed towards miniaturization, thinness and high reliability. In the prior art, it is difficult to manufacture too small integrally formed inductor, and the progress of many products is limited. The integration requirement of synchronous PCB board is higher and higher, the gap between components is smaller and smaller, and the reliability of electrodes and the requirement of bottom electrodes are very urgent.

The traditional inductor is limited in its forming mode, large pressure intensity is needed, the size is too small, the service life of a corresponding die is low, and it is difficult for the die to be smaller than 2 mm. Powder loading limits product thickness and it is difficult to achieve below 0.8 mm.

The background art is only used for assisting in understanding the inventive concept and technical solution of the present disclosure, and does not necessarily belong to the prior art of the present patent application. Insofar as there is no explicit evidence that the above-mentioned contents have been disclosed before the filing date of the present patent application, the above-mentioned background art should not be used for evaluating the novelty and inventive step of the present application.

SUMMARY OF THE INVENTION

The disclosure mainly aims to overcome the defects of the background technology, and provides an integrally formed inductor which is subminiature in size, ultra-thin and high in reliability and a manufacturing method thereof.

In order to achieve the object, the disclosure adopts the following technical solutions.

A manufacturing method of an integrally formed inductor, comprising the following steps of:

- sintering a soft magnetic material to prepare a magnetic core plate, wherein the magnetic core plate is provided with a plurality of grooves, and a magnetic core middle column is formed in each groove;
- respectively putting prefabricated hollow coils into the plurality of grooves, wherein the magnetic core middle column penetrates into the coils, and two terminals of the coils are left outside the grooves;

- putting the magnetic core plate provided with the coils into a forming die, adding a soft magnetic material in a fluid state, and integrally forming the soft magnetic material in the fluid state on the magnetic core plate through pressing;
- exposing two terminals of the coils contained in the pressed magnetic core plate by removing a part of the soft magnetic material, and cutting the magnetic core plate into a plurality of corresponding semi-finished inductors corresponding to each coil;
- coating the semi-finished inductor with an insulating material to form an insulating coating layer, and exposing only two terminals of the coils;
- the electrodes of the integrally formed inductor being formed by metallizing areas where two terminals of the coils are exposed on a surface of the insulating coating layer.

Furthermore, a sintering temperature of the magnetic core plate being sintered from the soft magnetic material is 600-1000° C., and the soft magnetic material sintered to the magnetic core plate is one of or a mixture of more than one of carbonyl iron powder, iron silicon, iron silicon chromium, iron nickel, iron nickel molybdenum, iron silicon aluminum, amorphous, nanocrystalline and nanocrystalline.

Further, the magnetic core plate is a rectangular plate, the plurality of grooves are distributed on the magnetic core plate in an array, the semi-finished inductor obtained by cutting is a rectangular parallelepiped, and two terminals of the coils are formed on a same main surface of the integrally formed inductor.

Furthermore, the hollow coils are coils formed in a pair-wound, vertically wound, fly-fork-wound or outer-wound manner, and a structure of the coils is circular, flat, square or multi-strand combination.

Further, the hollow coils are circular, racetrack-shaped or rectangular, and a shape of the grooves is matched with a shape of the hollow coils.

Furthermore, adding a soft magnetic material in a fluid state, and integrally forming the soft magnetic material in the fluid state on the magnetic core plate through pressing specifically comprises:

- enabling a temperature of the forming die to reach 120-200° C., adding the soft magnetic material liquefiable at 120-200° C., integrally forming the soft magnetic material in the fluid state on the magnetic core plate by using the pressure of less than 20 MPa, and baking at 100-300° C. for no less than 1 hour to completely solidify organic resin in the soft magnetic material in the fluid state.

Further, the soft magnetic material in the fluid state is one of or a mixture of more than one of carbonyl iron powder, iron silicon, iron silicon chromium, iron nickel, iron nickel molybdenum, iron silicon aluminum, amorphous, nanocrystalline, and nanocrystalline.

Further, the insulating material is a resin, preferably an epoxy resin, a phenolic resin or a silicone resin.

Further, metallization forms a metal layer, which is a combination of one or more layers of Cr, Ni, Ag, Cu, Ti and a Sn layer, preferably by means of PVD or electroplating, wherein the metallized layer is preferably a combination of Cu/Ni/Sn, and a total thickness of the coating layer is 3-15 μm.

An integrally formed inductor, which is an integrally formed inductor manufactured using the manufacturing method.

The disclosure has the following beneficial effects.

The disclosure provides a manufacturing method of an integrally formed inductor, which can efficiently manufacture a high-quality subminiature inductor, wherein a full plate model, namely a magnetic core plate, which is manufactured by sintering a soft magnetic material is used, the magnetic core plate is provided with a plurality of grooves, a magnetic core middle column is formed in each groove, after a plurality of coils are loaded, the full plate is integrally formed on the magnetic core plate by using the soft magnetic material in a fluid state, and then the full plate is cut into single inductor products for realizing subminiature size. The magnetic core of the inductor is integrally formed by combining two soft magnetic materials with different forms. Since the forming pressure of the liquid-phase soft magnetic material is low, the sintered magnetic core plate cannot be crushed when being integrally formed with the liquid-phase soft magnetic material, and the film damage of the coils is also avoided. Due to the fact that the magnetic core obtained by sintering the soft magnetic material and the liquid-phase soft magnetic material are solidified and formed to be combined together, the bonding force between the magnetic core and the liquid-phase soft magnetic material is strong, the high performance of the product can be achieved, and the yield of the product can be guaranteed by utilizing a low-pressure forming process. Meanwhile, the manufacturing efficiency of the integrally formed inductor of the present disclosure is extremely high, the production efficiency of products can be remarkably improved and the cost can be reduced through full-plate forming and batch cutting. The present disclosure also has the advantages that the two terminals of the coils are directly led to the main surface of the inductor, namely the electrode surface. During pasting, the terminals of the coils can be directly contacted with the PCB, the structure is simple, the risk of open circuit is avoided, and the reliability is extremely high. By using the manufacturing method of an integrally formed inductor of the present disclosure, the inductor product is easier to realize ultra-miniaturization, and particularly can be made thinner.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
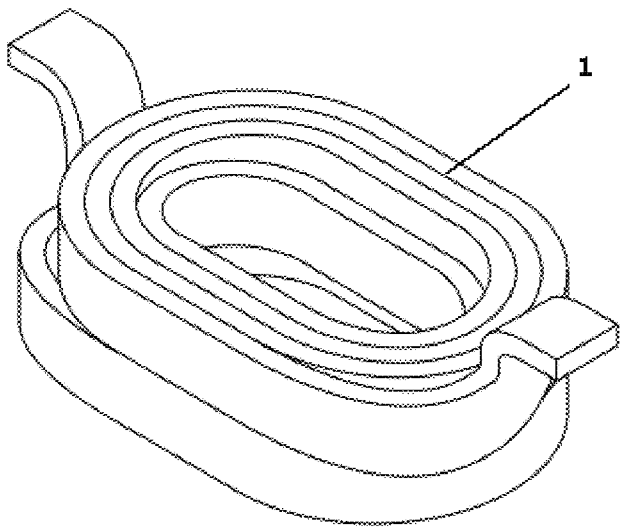
FIG. 1 is a schematic diagram showing a structure of a pair-wound prefabricated hollow coils according to an embodiment of the present disclosure.

Hereinafter, embodiments of the present disclosure will be described in detail. It should be emphasized that the following description is exemplary only and is not intended to limit the scope of the disclosure and its application.

It should be noted that when an element is referred to as being "fixed to" or "disposed on" another element, it can be directly on the other element or indirectly on the other element. When an element is referred to as being "connected to" another element, it can be directly connected to the other element or indirectly connected to the other element. In addition, the connection may be for either fixation or coupling or communication.

It is to be understood that the terms "length", "width", "upper", "lower", "front", "rear", "left", "right", "vertical", "horizontal", "top", "bottom", "inner", "outer", and the like, refer to orientations or positional relationships based on the orientations or positional relationships shown in the figures. It is merely convenient to describe the embodiments of the disclosure and to simplify the description, rather than to indicate or imply that a device or element referred to must have a particular orientation, be constructed and operated in a particular orientation, and thus should not be construed as limiting the disclosure.

Furthermore, the terms "first" and "second" are used for descriptive purposes only and are not to be construed as indicating or implying relative importance or implicitly indicating the number of technical features indicated. Thus, features defined with "first" and "second" may explicitly or implicitly include one or more such features. In the description of the embodiments of the disclosure, "plurality" means two or more, unless specifically defined otherwise.

With reference to FIGS. 1 to 10, the embodiment of the disclosure provides a manufacturing method of an integrally formed inductor, comprising the following steps of:

- sintering a soft magnetic material to prepare a magnetic core plate 3, wherein the magnetic core plate 3 is provided with a plurality of grooves 5, and a magnetic core middle column 4 is formed in each groove 5;
- respectively putting prefabricated hollow coils 1 or 2 into the plurality of grooves 5, wherein the magnetic core middle column 4 penetrates into the coils, and two terminals 6 of the coils are left outside the grooves 5;
- putting the magnetic core plate 3 provided with the coils into a forming die, adding a soft magnetic material in a fluid state, and integrally forming the soft magnetic material 7 in the fluid state on the magnetic core plate through pressing;
- exposing two terminals 6 of the coils contained in the pressed magnetic core plate by removing a part of the soft magnetic material, and cutting the magnetic core plate into a plurality of corresponding semi-finished inductors 9 corresponding to each coil;

coating the semi-finished inductor 9 with an insulating material to form an insulating coating layer 10, and exposing only two terminals of the coils;

the electrodes 11 of the integrally formed inductor being formed by metallizing areas where two terminals of the coils are exposed on a surface of the insulating coating layer 10.

In a preferred embodiment, a sintering temperature of the magnetic core plate being sintered from the soft magnetic material is 600-1000° C., and the soft magnetic material sintered to the magnetic core plate is one of or a mixture of more than one of carbonyl iron powder, iron silicon, iron silicon chromium, iron nickel, iron nickel molybdenum, iron silicon aluminum, amorphous, nanocrystalline and nanocrystalline.

In a preferred embodiment, the magnetic core plate is a rectangular plate, the plurality of grooves are distributed on the magnetic core plate in an array, the semi-finished inductor obtained by cutting is a rectangular parallelepiped, and two terminals of the coils are formed on a same main surface of the integrally formed inductor.

In a preferred embodiment, the hollow coils are coils formed in a pair-wound, vertically wound, fly-fork-wound or outer-wound manner, and a structure of the coils is circular, flat, square or multi-strand combination.

In a preferred embodiment, the hollow coils are circular, racetrack-shaped or rectangular, and a shape of the grooves is matched with a shape of the hollow coils.

In a preferred embodiment, adding a soft magnetic material in a fluid state, and integrally forming the soft magnetic material in the fluid state on the magnetic core plate through pressing specifically comprises:

enabling a temperature of the forming die to reach 120-200° C., adding the soft magnetic material liquefiable at 120-200° C., integrally forming the soft magnetic material in the fluid state on the magnetic core plate by using the pressure of less than 20 MPa, and baking at 100-300° C. for no less than 1 hour to completely solidify organic resin in the soft magnetic material in the fluid state.

In a preferred embodiment, the soft magnetic material in the fluid state is one of or a mixture of more than one of carbonyl iron powder, iron silicon, iron silicon chromium, iron nickel, iron nickel molybdenum, iron silicon aluminum, amorphous, nanocrystalline, and nanocrystalline.

In a preferred embodiment, the insulating material is a resin, preferably an epoxy resin, a phenolic resin or a silicone resin.

In a preferred embodiment, metallization forms a metal layer, which is a combination of one or more layers of Cr, Ni, Ag, Cu, Ti and a Sn layer, preferably by means of PVD or electroplating, wherein the metallized layer is preferably a combination of Cu/Ni/Sn, and a total thickness of the coating layer is 3-15 μm.

The features and advantages of specific embodiments of the present disclosure are further described below with reference to the accompanying drawings.

The magnet is formed by combining two different forms of soft magnetic materials. A shape of soft magnetic material is magnetic conductivity high-density sintered magnetic core. The material of the magnetic core is made of one of or a mixture of more than one of carbonyl iron powder, iron silicon, iron silicon chromium, iron nickel, iron nickel molybdenum, iron silicon aluminum, amorphous, nanocrystalline and nanocrystalline. Another material is a soft magnetic material with low forming pressure (liquefiable under 120-200° C.), the material of which is one of or a mixture of more than one of carbonyl iron powder, iron silicon, iron silicon chromium, iron nickel, iron nickel molybdenum, iron silicon aluminum, amorphous, nanocrystalline and nanocrystalline.

The disclosure also provides a manufacturing method of the subminiature inductor, comprising the following steps of:

S1: prefabricating a sintered magnetic core comprising a plurality of middle columns and grooves;

S2: prefabricating coils, wherein hollow coils with a predetermined shape are formed by winding copper wires;

S3: implanting the prefabricated hollow coils into the magnetic core with the middle column and the grooves, wherein the middle column of the magnetic core is matched with an inner ring of the coils, and a tail end of the coils is upwards exposed out of the grooves;

S4: putting the magnetic core implanted with the coils into a forming die, wherein the forming die has reached a certain temperature (120-200° C.), then adding a soft magnetic material formed by low-pressure forming, pressing the two materials into a whole by using a low pressure (<20 Mpa), and baking at 100-300° C. for no less than one hour to completely solidify the organic resin in the low-pressure soft magnetic material;

S5: exposing the tail terminals of the coils by grinding the pressed magnetic plate containing the coils;

S6: cutting a corresponding semi-finished inductor according to the size of the products;

S7: coating the semi-finished inductor with resin;

S8: removing the resin coating auxiliary layer on the tail wires of the coils to expose the terminals of the tail wires of the coils;

S9: forming the inductor by metallization on the two tail terminals of the coils.

Figure 3:
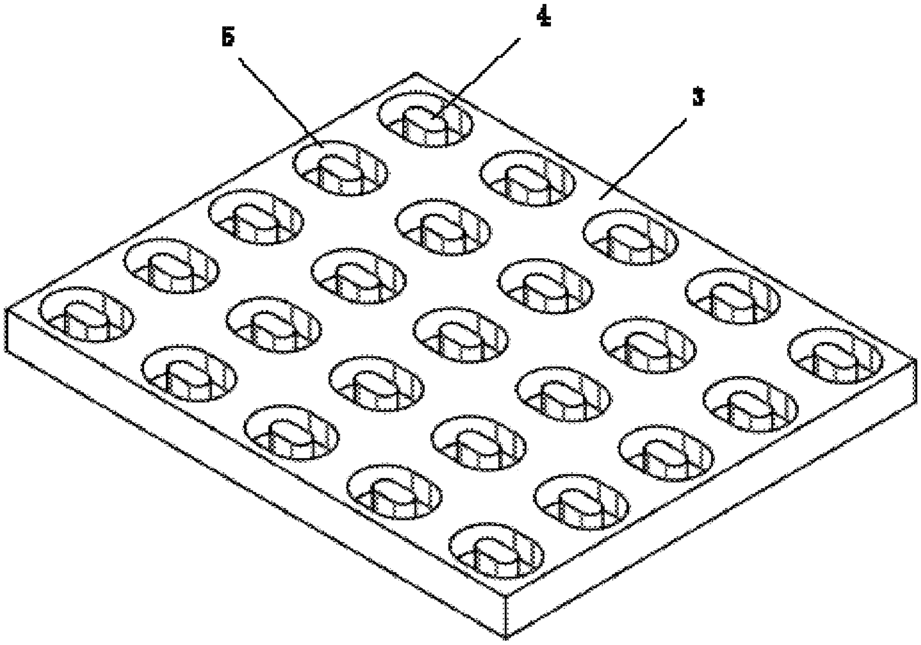
FIG. 3 is a schematic diagram showing a structure of a sintered magnetic core with a plurality of grooves according to an embodiment of the present disclosure.

In a specific embodiment, the manufacturing method of the subminiature inductor comprises the following steps:

manufacturing a sintered magnetic core in FIG. 3 with a plurality of middle columns and grooves by using alloy magnetic powder, wherein the effective magnetic conductivity of the magnetic core is >50; and the sintering temperature of the magnetic core made of the alloy magnetic powder is 600-1000° C.

Figure 2:
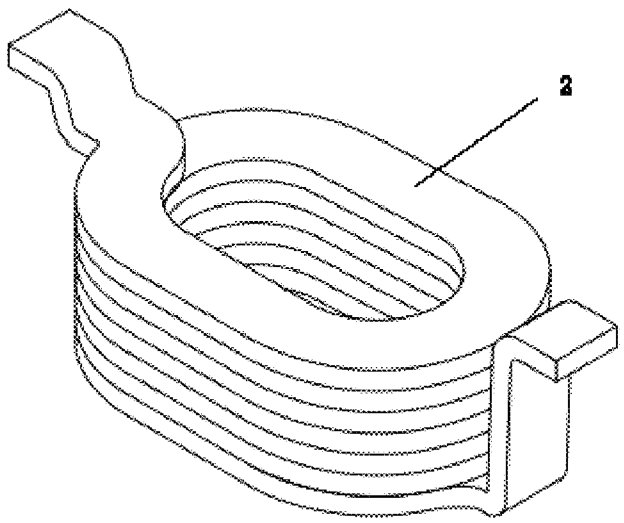
FIG. 2 is a schematic diagram showing a structure of a vertically wound prefabricated hollow coils according to an embodiment of the present disclosure.

According to the design specification, the self-adhesive flat wires are adopted to wind up the pair-wound hollow coils in FIG. 1 and the vertically wound hollow coils in FIG. 2 with the tail wires wound up, and self-adhesive enameled wires with temperature resistance grade of no less than 200° C. are preferred in consideration of the temperature resistance grade requirement of the pasting inductor.

Figure 4:
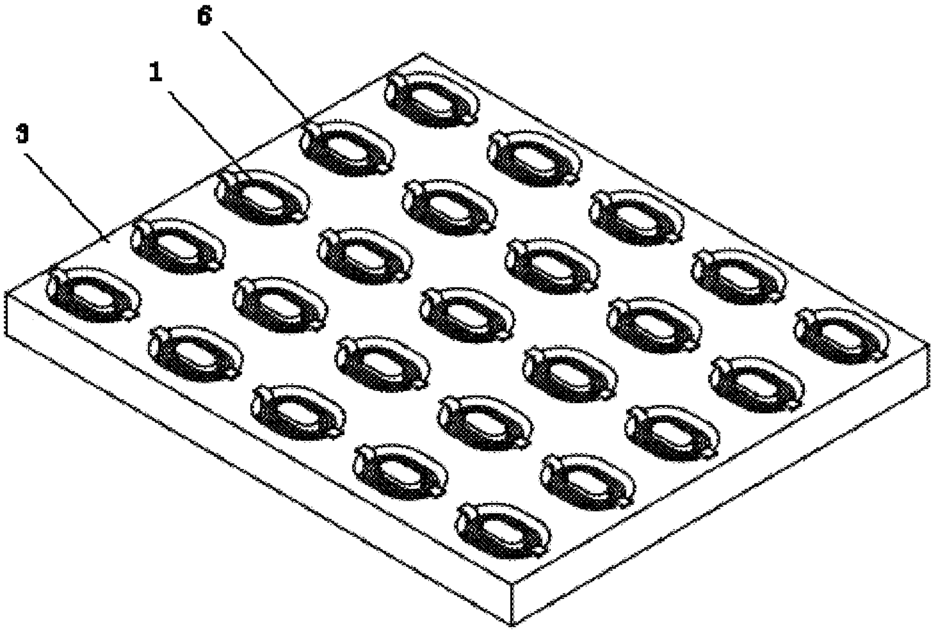
FIG. 4 is a schematic diagram showing a structure of a magnetic core in which grooves are implanted into pair-wound hollow coils according to an embodiment of the present disclosure.

The hollow coils shown in FIG. 1 are implanted into a plurality of middle columns and groove cores as shown in FIG. 3, an inner diameter of the hollow coils is matched with the middle columns of the magnetic core one by one, and the assembling is as shown in FIG. 4.

Figure 5:
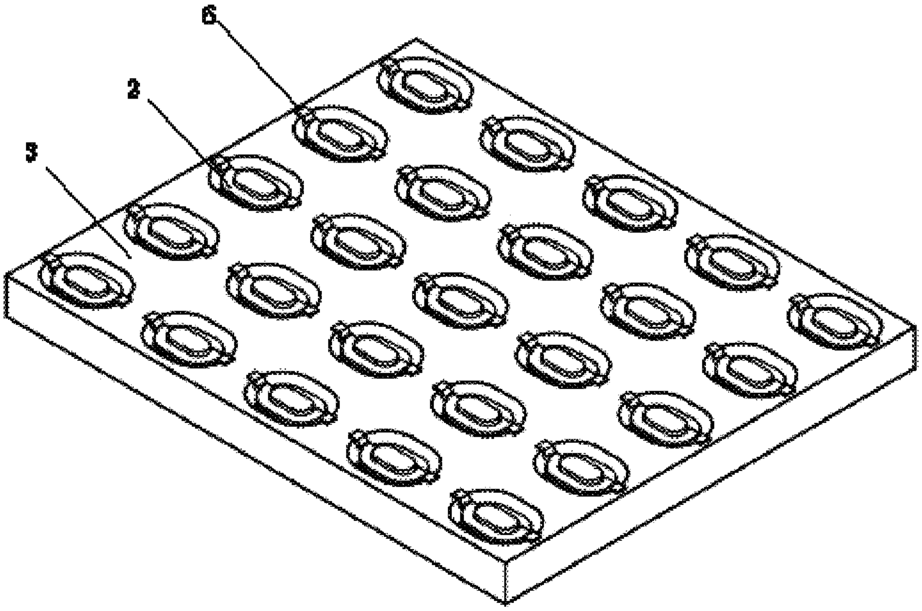
FIG. 5 is a schematic diagram showing a structure of a magnetic core in which grooves are implanted into vertically wound hollow coils according to an embodiment of the present disclosure.

The hollow coils shown in FIG. 2 are implanted into a plurality of middle columns and groove magnetic core as shown in FIG. 3, the inner diameter of the hollow coils is matched with the middle columns of the magnetic core one by one, and the assembling is as shown in FIG. 5.

Figure 6:
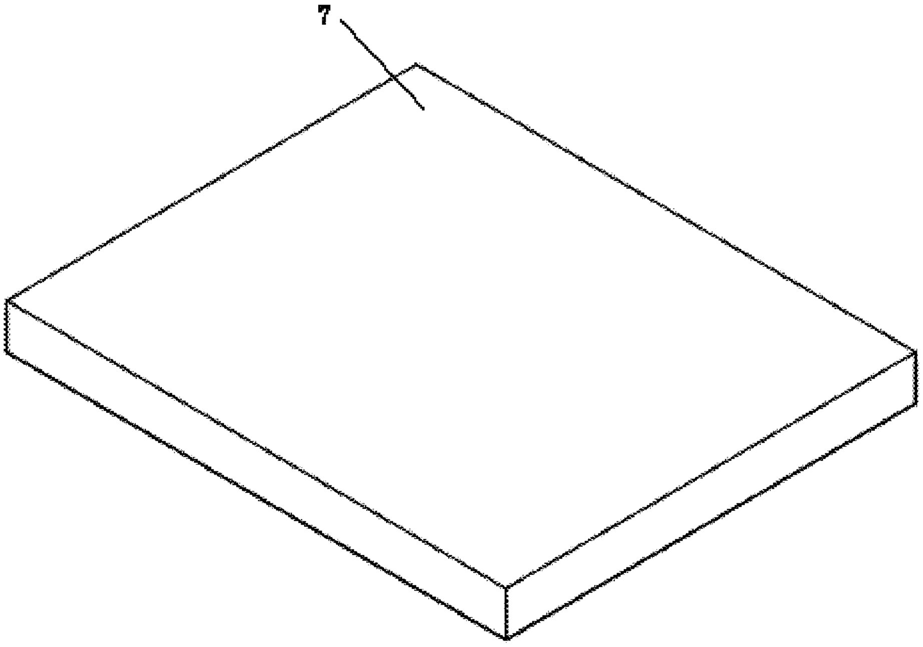
FIG. 6 is a schematic diagram showing a structure of a magnetic core formed after coils are implanted according to an embodiment of the present disclosure.

A soft magnetic material is added, the low-voltage forming process is adopted, the pressure is less than 20 MPa. The magnetic core is prevented from being crushed, and the added soft magnetic material is well combined with the sintered magnetic core to prevent falling off. Considering the optimal characteristic can only be achieved with the high density, a transfer molding plastic packaging material is preferably adopted, and the coils and the magnetic core are coated to form a full plate magnetic sheet as shown in FIG. 6. Baking is performed at 150-200° C. for 1-5 hours to ensure resin solidifying to maximum strength.

Figure 7:
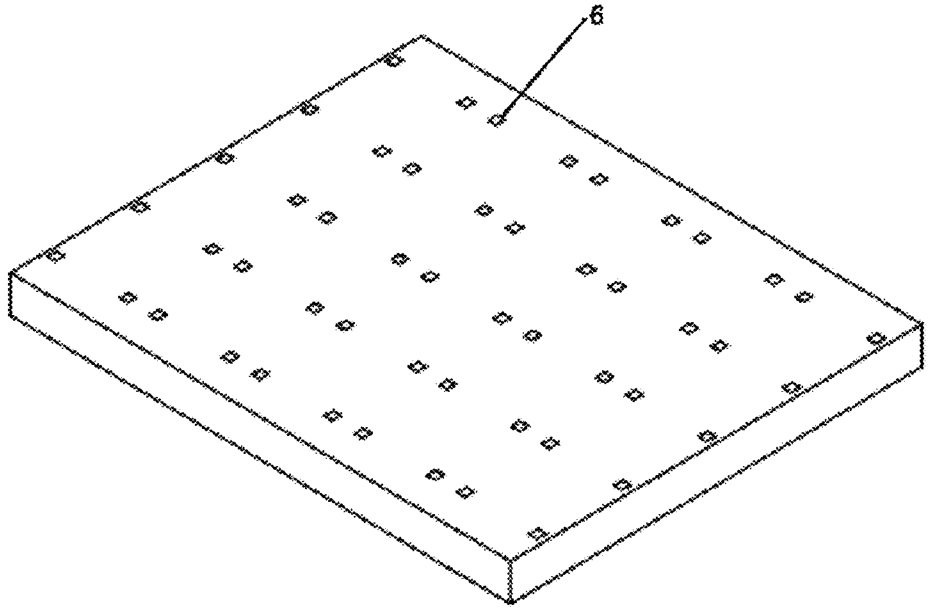
FIG. 7 is a schematic diagram showing a structure in which a tail wire of coils is exposed after grinding a formed magnetic plate according to an embodiment of the present disclosure.

Tail wires of the coated coils are exposed by grinding to form a ground magnetic plate, as shown in FIG. 7. The magnetic plate can be ground to a very thin size, and the thickness can be 0.5 mm.

Figure 8:
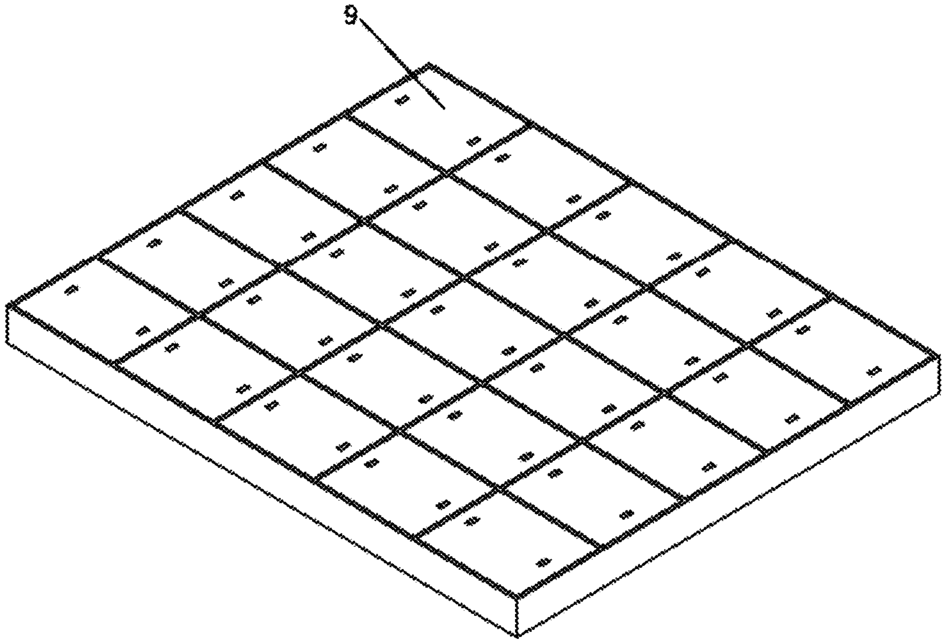
FIG. 8 is a schematic diagram showing a cut structure of a formed magnetic plate according to an embodiment of the present disclosure.
Figure 9:
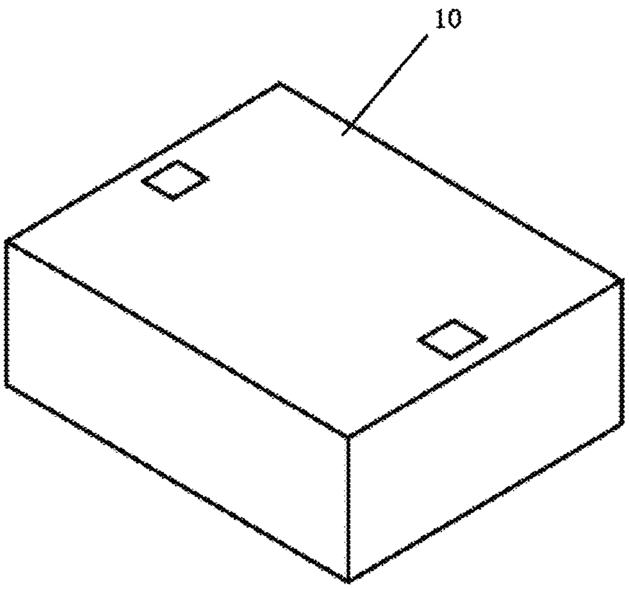
FIG. 9 is a schematic diagram showing a structure of a cut semi-finished product according to an embodiment of the present disclosure.

According to the dividing line shown in FIG. 8, a semi-finished product with a corresponding size is cut out via cutting, and the cutting precision requirement is ±0.01 mm, so that the length and the width there can be 1.0*0.5 mm, and the subminiature inductor can be manufactured.

The semi-finished product is treated via coating, so that the insulation property and pressure resistance of the product are improved. Organic coating can be selected according to the insulation property, wherein the coating layer is 3-15 μm. Inorganic coatings may be preferred in view of aging issues, the coating is in nanoscale.

The coating layer coated on the tail wires of the coils is removed via a laser to expose the copper wires.

Figure 10:
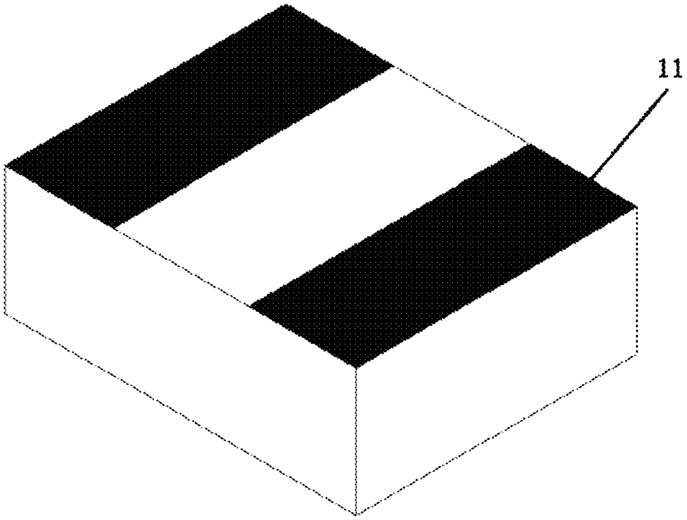
FIG. 10 is a schematic diagram of a structure of a metallized product according to an embodiment of the present disclosure.

PVD or electroplating is adopted, wherein the metallized layer is preferably Cu/Ni/Sn, the total thickness of the plating layer is 3-15 μm, metallization is carried out at the bottom of the inductor, complete contact between the metallized layer and the tail wires of the coils is ensured, and a finished product is manufactured, as shown in FIG. 10.

Compared with a traditional inductor, the inductor provided by the embodiment of the disclosure can be made smaller in size, higher in product yield and better in comprehensive electrical characteristics. The inductor provided by the embodiment of the disclosure is large in one-time forming quantity, high in production efficiency and low in manufacturing cost. The electrodes of the inductor of the embodiment of the disclosure are formed as bottom electrodes, and the risk of open circuit is lower. When the inductor provided by the embodiment of the disclosure is used on the PCB, the distance between components can be smaller, and the integration level is higher. The integrally formed inductor provided by the embodiment of the disclosure has the advantages of low EMI and high reliability.

The Background of the present disclosure may contain background information regarding the problem or environment of the present disclosure and does not necessarily describe the prior art. Accordingly, nothing contained in the Background is admitted by the applicant as the prior art.

The foregoing is a further detailed description of the disclosure in connection with specific/preferred embodiments, and is not to be construed as limiting the disclosure to such specific embodiments. It will be apparent to those skilled in the art that various substitutions and modifications can be made to the described embodiments without departing from the conception of the disclosure, and it is intended that such substitutions and modifications fall within the scope of protection of the disclosure. In the description of this specification, the description of the reference terms "an embodiment", "some embodiments", "preferred embodiments", "examples", "specific examples", or "some examples", etc., means that a particular feature, structure, material, or characteristic described in connection with the embodiment or example is included in at least one embodiment or example of the disclosure. In the present specification, schematic representations of the terms are not necessarily directed to the same embodiments or examples. Furthermore, the particular feature, structure, material, or characteristic described may be combined in any one or more embodiments or examples in a suitable manner. Various embodiments or examples described in this specification, as well as features of various embodiments or examples, may be combined and assembled by those skilled in the art without conflicting with each other. Although embodiments of the present disclosure and advantages thereof have been described in detail, it should be understood that various changes, substitutions and alterations can be made herein without departing from the scope of protection of the patent application.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A manufacturing method of an integrally formed inductor, comprising the following steps of:

sintering a soft magnetic material to prepare a magnetic core plate, wherein the magnetic core plate is provided with a plurality of grooves, and a magnetic core middle column is formed in each groove;

respectively putting prefabricated hollow coils into the plurality of grooves, wherein the magnetic core middle column penetrates into the coils, and two terminals of the coils are left outside the grooves;

putting the magnetic core plate provided with the coils into a forming die, adding a soft magnetic material in a fluid state, and integrally forming the soft magnetic material in the fluid state on the magnetic core plate through pressing; wherein enabling a temperature of the forming die to reach 120-200° C., adding the soft magnetic material liquefiable at 120-200° C., integrally forming the soft magnetic material in the fluid state on the magnetic core plate by using the pressure of less than 20 MPa, and baking at 100-300° C. for no less than 1 hour to completely solidify organic resin in the soft magnetic material in the fluid state;

exposing two terminals of the coils contained in the pressed magnetic core plate by removing a part of the soft magnetic material, and cutting the magnetic core plate into a plurality of corresponding semi-finished inductors corresponding to each coil;

coating the semi-finished inductor with an insulating material to form an insulating coating layer, and exposing only two terminals of the coils;

forming electrodes of the integrally formed inductor by metallizing areas where two terminals of the coils are exposed on a surface of the insulating coating layer.

2. The manufacturing method of an integrally formed inductor according to claim 1, wherein a sintering temperature of the magnetic core plate being sintered from the soft magnetic material is 600-1000° C., and the soft magnetic material sintered to the magnetic core plate is one of or a mixture of more than one of carbonyl iron powder, iron silicon, iron silicon chromium, iron nickel, iron nickel molybdenum, iron silicon aluminum, amorphous, nanocrystalline and nanocrystalline.

3. The manufacturing method of an integrally formed inductor according to claim 1, wherein the magnetic core plate is a rectangular plate, the plurality of grooves are distributed on the magnetic core plate in an array, the semi-finished inductor obtained by cutting is a rectangular parallelepiped, and two terminals of the coils are formed on a same main surface of the integrally formed inductor.

4. The manufacturing method of an integrally formed inductor according to claim 1, wherein the hollow coils are coils formed in a pair-wound, vertically wound, fly-fork-wound or outer-wound manner, and a structure of the coils is circular, flat, square or multi-strand combination.

5. The manufacturing method of an integrally formed inductor according to claim 1, wherein the hollow coils are circular, racetrack-shaped or rectangular, and a shape of the grooves is matched with a shape of the hollow coils.

6. The manufacturing method of an integrally formed inductor according to claim 1, wherein the soft magnetic material in the fluid state is one of or a mixture of more than one of carbonyl iron powder, iron silicon, iron silicon chromium, iron nickel, iron nickel molybdenum, iron silicon aluminum, amorphous, nanocrystalline, and nanocrystalline.

7. The manufacturing method of an integrally formed inductor according to claim 1, wherein the insulating material is a resin, preferably an epoxy resin, a phenolic resin or a silicone resin.

8. The manufacturing method of an integrally formed inductor according to claim 1, wherein metallization forms a metal layer, which is a combination of one or more layers of Cr, Ni, Ag, Cu, Ti and a Sn layer, preferably by means of PVD or electroplating, wherein the metallized layer is preferably a combination of Cu/Ni/Sn, and a total thickness of the coating layer is 3-15 μm.

* * * * *